United States Patent [19]
Min

[11] Patent Number: 5,930,101
[45] Date of Patent: Jul. 27, 1999

[54] OVERVOLTAGE CUT-OFF CIRCUIT OF PRIVATE EXCHANGE BRANCH HAVING TIE LINE

[75] Inventor: Kyung-Hwa Min, Suwon, Rep. of Korea

[73] Assignee: SamSung Electronics Co., Ltd., Kyungki-do, Rep. of Korea

[21] Appl. No.: 08/792,677

[22] Filed: Jan. 29, 1997

[30] Foreign Application Priority Data

Jan. 29, 1996 [KR] Rep. of Korea ............... 1996-1930

[51] Int. Cl.⁶ ....................................................... H02H 1/00
[52] U.S. Cl. ........................... 361/119; 361/56; 361/111; 361/127
[58] Field of Search ........................... 379/412, 413, 379/377, 347, 331, 382, 26, 27, 32; 361/124, 125, 118, 117, 56, 91, 111, 119, 127

[56] References Cited

U.S. PATENT DOCUMENTS

| | | | |
|---|---|---|---|
| 4,310,725 | 1/1982 | Mehaffey | 179/18 AH |
| 4,398,064 | 8/1983 | Formosa, Jr. | 179/18 AH |
| 4,467,148 | 8/1984 | Stafford et al. | 179/175.3 R |
| 4,516,070 | 5/1985 | Brown et al. | 324/177 |
| 4,894,860 | 1/1990 | Korski et al. | 379/240 |
| 4,903,295 | 2/1990 | Shannon et al. | 379/437 |
| 4,979,071 | 12/1990 | Ito et al. | 361/56 |
| 5,392,328 | 2/1995 | Schmidt et al. | 379/10 |

*Primary Examiner*—Jeffrey Gaffin
*Assistant Examiner*—Stephen Jackson
*Attorney, Agent, or Firm*—Robert E. Bushnell, Esq

[57] ABSTRACT

An over voltage cut-off circuit of a private branch exchange for cutting off the over voltage induced into an E&M (ear and mouth) tie line, includes an E ("ear") line over voltage cut-off circuit composed of an E arrestor which generates heat by the over voltage induced through the E port, and also of an E fuse which melts and blows if it surpasses a melting point. The circuit may also include an M ("mouth") line over voltage cut-off circuit. The M line over voltage cut-off circuit includes an E seizure signal detecting apparatus for detecting the input of a seizure signal to the E line, a switching apparatus switched to off-hook if the seizure signal is detected, or maintaining on-hook if not, and a discharging apparatus made up with an M fuse being opened due to the M arrestor's discharged heat if over voltage is induced through the M port in on-hook state, the over voltage being converted into an attenuation voltage by the M arrestor and discharged through the attenuation arrestor if it is induced through the M port in off-hook state.

34 Claims, 4 Drawing Sheets

5,930,101

OVERVOLTAGE CUT-OFF CIRCUIT OF PRIVATE EXCHANGE BRANCH HAVING TIE LINE

CLAIM OF PRIORITY

This application makes reference to, incorporates the same herein, and claims all benefits accruing under 35 U.S.C. §119 from applications for Overvoltage Cut-off Circuit of Private Exchange Branch Having Tie Line earlier filed in the Korean Industrial Property Office on Jan. 29, 1996, and there duly assigned Ser. No. 1930/1996.

BACKGROUND OF THE INVENTION

1. Field of the Invention

The present invention relates to an over voltage cut-off circuit. More particularly, the present invention to a cut-off circuit which cuts off the over voltage at the ear and mouth tie line.

2. Description of the Related Art

Private automatic branch exchanges are frequently connected together by a tie line. Such a tie line is different from a line through central office exchange between them. The tie line types include R/D (ring and down) type, B/W (both and way) type and E/M (ear and mouth) type. Among them, the E/M or "E & M" or "ear and mouth" type is widely used.

The tie lines are in demand because they are trouble free in connecting phone calls through office exchange. Therefore, the tie line network is used in cases that business phone calls are frequently between organizations in a company or corporation, of which the places of business are scattered over various areas.

The E & M (ear and mouth) tie lines are classified into two-line or four-line E & M (ear and mouth) types, depending upon whether Tip line or Ring line each is composed of one or two lines. The term "E line" comes from the word "ear." The term "M line" comes from the word "mouth." The E line refers to a line receiving a seizure signal from the tie line, the reception being from the other party. The M (mouth) line transmits a seizure acknowledge signal when receiving the seizure signal or tie line seizure signal. Also, the parts from the receiving and transmitting are typically respectively referred in the art as the "E" parts and the "M" parts. On this matter, exemplars of the contemporary practice include Schmidt et al. (U.S. Pat. No. 5,392,328, System And Method For Automatically Detecting Root Causes Of Switching Connection Failures In A Telephone Network, Feb. 21, 1995) shows a system and method for automatically detecting root causes of switching connection failures in a telephone network. An operating system is provided for an analog switching machine having switch fabric formed by multiple line and trunk line networks using interconnected switch stages, with each switch stage having multiple grid connections and making post-connection continuity checks. Korsky et al. (U.S. Pat. No. 4,894,860, Trunk Interface Circuitry For Telephone Systems, Jan. 16, 1990) discusses a trunk interface circuitry for telephone systems. More particularly, Korsky et al. discusses an improved trunk interface circuitry for telephone system common equipment, connecting a local customer system to a central office of the telephone company. Brown et al. (U.S. Pat. No. 4,516,070, Magnetic Current Sensor With Offset and Load Correction, May 7, 1985) discusses magnetic current sensor with offset and load correction. A mechanized system distributes the access, test and communication functions to the point of testing. Typically, the centralized switching facility serves the telephone loops and equipment to be tested. Stafford et al. (U.S. Pat. No. 4,467,148, Telephone Line Analyzer, Aug. 21, 1984) discusses a telephone line analyzer providing automatic attenuation measurement of tie trunk lines and other telephone lines through measurement of the electrical level of a tone responder. Formosa, Jr. (U.S. Pat. No. 4,398,064, Call-For-Service And Continuity Sensor Circuit, Aug. 9, 1983) discusses a call-for-service and continuity sensor circuit for use with a trunk circuit of a digital telephone system interfacing with a central office via ground start signaling to provide for detection of a "call-for-service" signal to the telephone system by the central office. Mehaffey (U.S. Pat. No. 4,310,725, Interface For Private Branch Exchange, Jan. 12, 1982) discusses an interface for private branch exchange. The interface connects a PBX line to a central office trunk and provides a supervisory signal for accepting hook switch and dial pulse inputs, which are being readily adaptable to ground start trunks and loop start trunks. Based on my study of these exemplars of the contemporary practice and art, I find that there is a need for an improved over voltage cut-off circuit.

SUMMARY OF THE INVENTION

Accordingly, it is an object of the present invention to provide an improved over voltage cut-off process and circuit.

It is further object to provide an improved over voltage cut-off process and circuit of a private automatic branch exchange which has a tie line (a transmission line between power systems).

It is another object to provide an improved cut-off process and circuit which cuts off the over voltage at the E&M (ear and mouth) tie line.

It is another object to provide an improved over voltage cut-off process and circuit of a private automatic branch exchange for cutting off the over voltage at an E&M (ear and mouth) tie line.

It is another object to provide an improved over voltage cut-off process and circuit of a private automatic branch exchange for cutting off the over voltage at a E line.

It is still another object to provide an improved over voltage cut-off process and circuit of a private automatic branch exchange for cutting off the over voltage at a M line.

To accomplish these and other objects of the present invention, there is provided an over voltage cut-off circuit of a private automatic branch exchange for cutting off the over voltage at an E&M (ear and mouth) tie line. The circuit may be constructed with an E line over voltage cut-off circuit using an E arrestor which generates heat by the overvoltage induced through the E port, and of an E fuse which melts and blows if the temperature of the fuse surpasses a melting point. An M line over voltage cut-off circuit includes an E seizure signal detector for detecting the input of a seizure signal to the E line; switching a switching unit to off-hook if the seizure signal is detected, or maintaining on-hook if not; and a discharging unit constructed with an M fuse, an M arrestor, a resistor, polyswitch, and an attenuation arrestor, the M fuse being opened due to the M arrestor's discharged heat if over voltage is induced through the M port in on-hook state, the over voltage being converted into an attenuation voltage by the M arrestor and discharged through the attenuation arrestor if it is induced through the M port in off-hook state.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2A shows an over voltage at a the E&M (ear and mouth) tie line being cut off in the circuit of FIG. 2A, and where FIG. 3B shows an over voltage at a E&M (ear and mouth) tie line being cut off in the circuit of FIG. 2B.

DETAILED DESCRIPTION OF THE PREFERRED EMBODIMENT

An over voltage can produced at a E&M (ear and mouth) tie line by a surge due to an electrical thunder or lightening, or an accident such as the collapse of power lines onto the earth. Such an over voltage may cause a fire or breakdown of a private automatic branch exchange. A contemporary over voltage cut-off circuit to prevent such accidents is shown in FIGS. 1A and 1B.

Figure 1A:
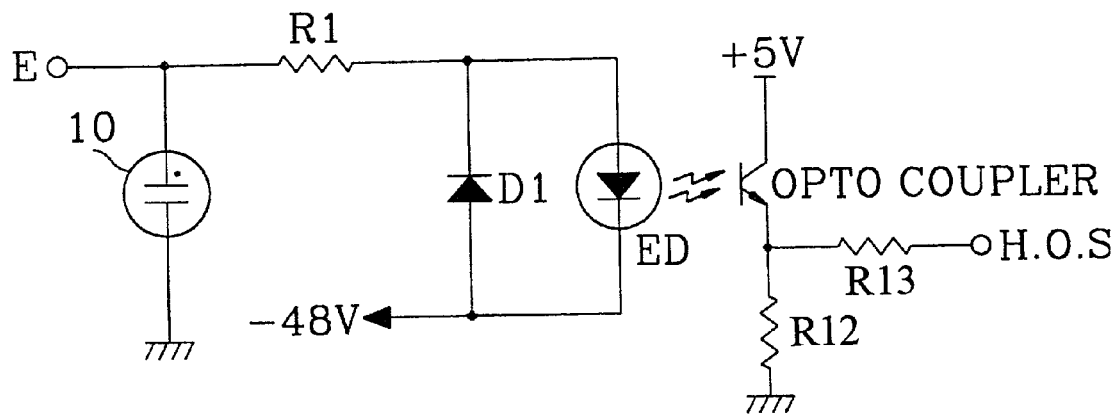
FIGS. 1A and 1B are circuit diagrams showing an over voltage cut-off circuit for cutting off the over voltage at a E&M (ear and mouth) tie line of a contemporary private automatic branch exchange.

FIG. 1A shows an over voltage cut-off circuit designed to cut off the over voltage at a E line. The over voltage induced through the E port is applied to a discharge tube 110 and resistor R11. At this time, however, while the discharge tube 110 starts to discharge and generates heat, the resistor R11 does not operate properly (or "is not opened") due to the heat generated, and thus cannot cut off the over voltage.

Figure 1B:
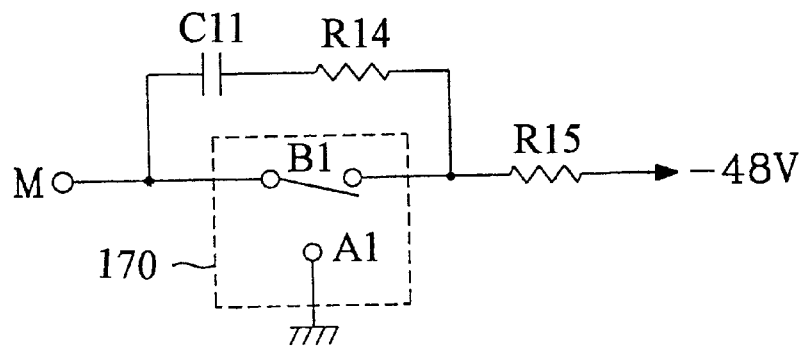

FIG. 1B shows an over voltage cut-off circuit designed to cut off the over voltage at a M line. First, in the on-hook state a relay 170 is linked to port A1 and grounded, and in the off-hook state it is linked to port B1 and connected to −48 V power supply. In case that the relay 170 is grounded, it does not matter even if an over voltage is induced. In case that the relay 170 is connected to −48 V power supply and if an over voltage is induced, a fire or breakdown occurs in the private automatic branch exchange. Further, problems such as a fuse opening or a fire may occur in a fuse of an equipment. This is especially true for a fuse of an equipment of the "private automatic branch exchange protects" against the over voltage.

Figure 2A:
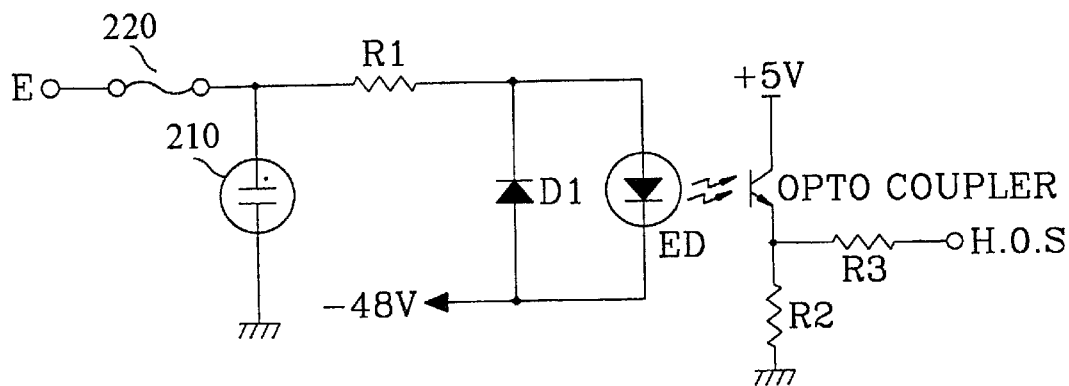
FIGS. 2A and 2B are circuit diagrams showing an over voltage cut-off circuit for cutting off the over voltage at the E&M (ear and mouth) tie line of the private automatic branch exchange in accordance with an embodiment of the present invention.
Figure 2B:
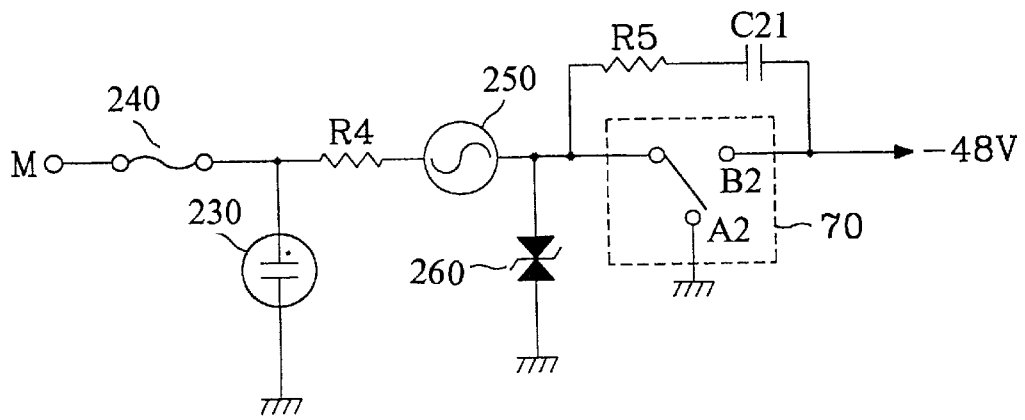

FIGS. 2A and 2B are diagrams showing an over voltage cut-off circuit of private automatic branch exchange for cutting off an over voltage at a E&M (ear and mouth) tie line in accordance with the practice of the present invention. Among these two diagrams, FIG. 2A is a diagram showing the over voltage cut-off circuit of private automatic branch exchange forcutting off the over voltage induced into E line.

In case that over voltage is induced through E port, discharge tube 210 generates heat during discharging if the over voltage is higher than a reference discharge voltage. Therefore fuse 220 melts and blows due to the temperature surpassing its melting point. The discharge tube 210 does not discharge in case that the over voltage is lower than the reference discharge voltage. Therefore current corresponding to the over voltage flows through resistor R1. R1 becomes gradually heated and opened within a few seconds. At this time the speed at which R1 gets opened is inversely proportional to the amount of the current. That is, when the amount of the current is large, R1 gets opened in several or several ten seconds. When the amount of the current is small, R1 gets opened in several ten or hundred seconds. As described above, by cutting off the over voltage induced into E port, the system connected to the back end is protected.

FIG. 2B is a diagram of showing an over voltage cut-off circuit of private automatic branch exchange for cutting off the over voltage induced into M line. The diagram shows that the over voltage induced through M port in state the relay 270 is on-hook is cut off. The over voltage induced through M port is applied to heat fuse 240 and a discharge tube 230. The discharge tube 230 does not discharge in case that the voltage is lower than a discharge starting voltage. Therefore, the over voltage is applied to polyswitch 250 through R4. Thus, over voltage is applied to ground through R5 and capacitor C1 if it is lower than the working (operable) voltage of bi-directional (bilateral) diode 260. And if the operable voltage of bi-directional diode 260 is lower than the over voltage, this is applied to ground through the bi-directional diode 260.

Figure 4A:
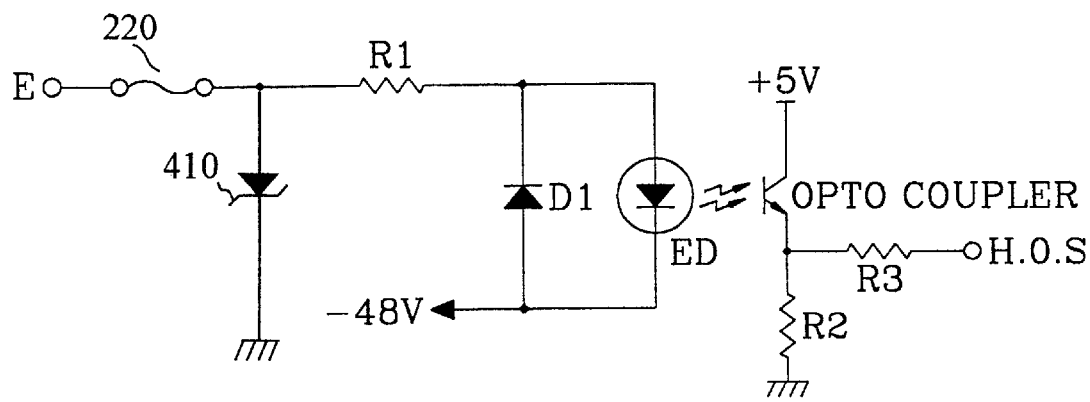
FIGS. 4A and 4B are circuit diagrams showing an over voltage cut-off circuit forcutting off the over voltage at a E&M (ear and mouth) tie line of the private automatic branch exchange in accordance with an embodiment of the present invention.
Figure 4B:
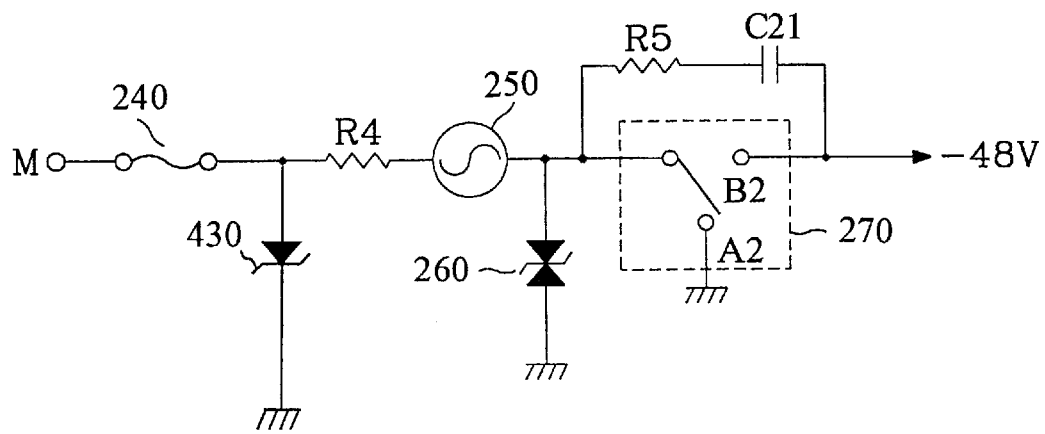

The discharge tube 230 generates heat during discharging in case that the over voltage is higher than the discharge starting voltage. Therefore the fuse 240 gets melted and broken off if the temperature of the heat surpasses its fusing point. Alternatively, in case that the induced current is above the corresponding rated current, the fuse 240 operates as just a fuse itself. The polyswitch 250 returns to a normal state after being opened upon the mouth arrestor generating heat when an overcurrent from the mouth over voltage occurs. As shown in FIGS. 4A and 4B, the discharge tubes 210 and 230 can be substituted by Zener diodes 410 and 430. The discharge tubes 210 and 230 can be ionized gas filled vacuum tubes.

Figure 3A:
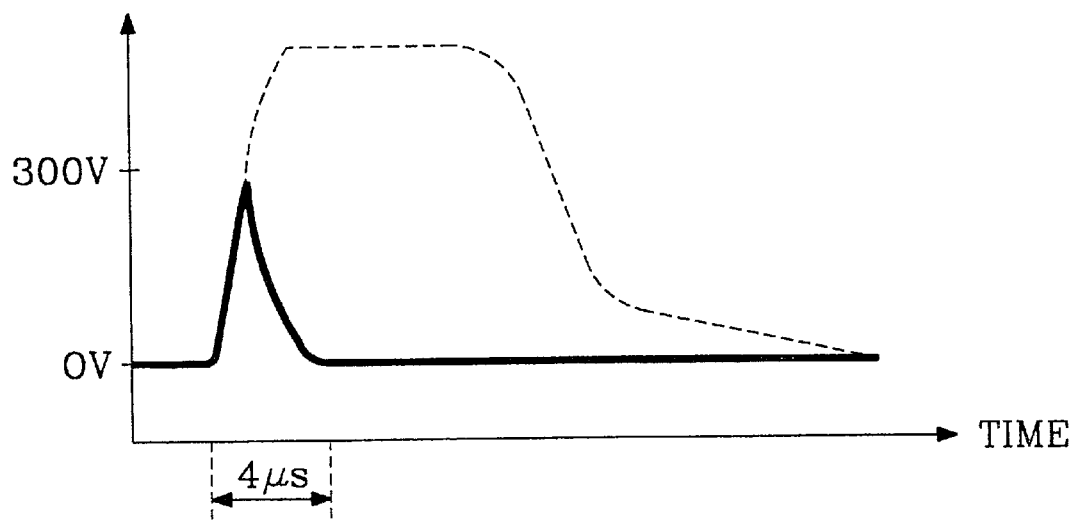
FIGS. 3A and 3B are voltage-time graphs, where
Figure 3B:
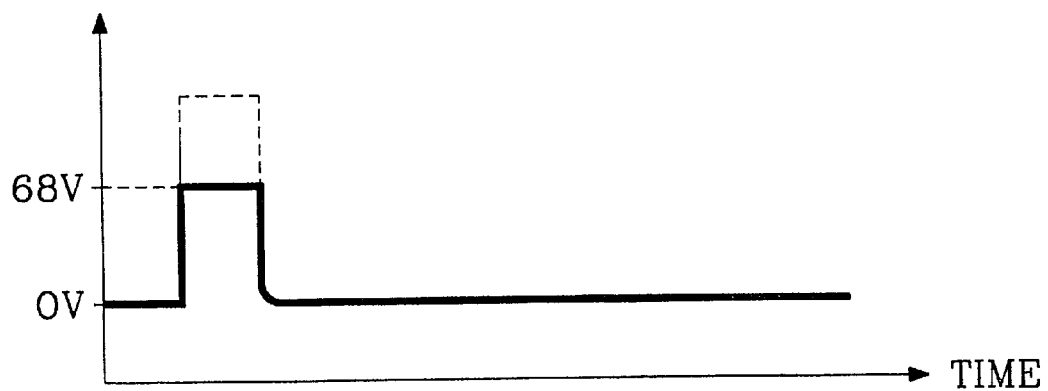

FIGS. 3A and 3B are diagrams of showing the over voltage at a E&M (ear and mouth) tie line being cut off by applying the present invention. Among the two diagrams, FIG. 3A shows that the over voltage is cut off by the fuse 220 and discharge tube 210 shown in FIG. 2A, and also by fuse 240 and discharge tube 230 shown in FIG. 2B. The total cycle of rise in voltage, cutoff, and fall in voltage can occur in approximately four microseconds. FIG. 3B shows that the over voltage input (induced) by bi-directional diode 260 shown in FIG. 2B is converted into an attenuation voltage.

As described above, the present invention provides an advantage such as preventing from an outbreak of a fire or breakdown of private automatic branch exchange by cutting off the over voltage induced E&M (ear and mouth) tie line connecting each private automatic branch exchange Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus comprising:
   an ear line over voltage cut-off circuit comprising:
      an ear fuse connected to an ear line capable of reception of signals, said ear fuse melting and blowing when temperature of said ear fuse surpasses a melting point, and an ear arrestor generating heat by an ear over voltage induced through an ear port;
a mouth line over voltage cut-off circuit comprising:
an ear seizure signal detector detecting input of a seizure signal to the ear line,
a switching unit switching to off-hook when the seizure signal is detected, and maintaining on-hook when the seizure signal is not detected, and
a discharging unit comprising:
a mouth fuse connected to a mouth line capable of reception of signals,
a mouth arrestor capable of discharging heat,
a resistor connected to said mouth arrestor,
a polyswitch connected to said resistor and switching from an electrically conducting state upon being heated to an electrically non-conducting state, and
an attenuation arrestor, said mouth fuse being opened when a mouth over voltage causes overheating from the heat of said mouth arrestor when the mouth over voltage is induced through a mouth port in an on-hook state, and the mouth over voltage being converted into an attenuation voltage by the mouth arrestor and discharged through the attenuation arrestor when the mouth over voltage is induced through the mouth port during an off-hook state.

2. The apparatus as claimed in claim 1, further comprised of said attenuation arrestor comprising a diode.

3. The apparatus as claimed in claim 1, further comprised of said attenuation arrestor suppressing bi-directional transient voltage.

4. The apparatus as claimed in claim 1, further comprised of said polyswitch returning to said electrically conducting state after being in said electrically open state in response to generation of heat when an overcurrent from the mouth over voltage occurs.

5. The apparatus as claimed in claim 1, further alternating overvoltages induced through said ear port and said mouth port of a transmission line between power systems of a private branch exchange.

6. A circuit for cutting off an over voltage induced into a TIE line type of a private branch exchange, comprising:
an ear line of said TIE line type for receiving a seizure signal from another subscriber through said private branch exchange;
an ear fuse disposed at an ear port of said ear line for melting and forming an electrically open link between said ear port and said ear line when a temperature of said ear fuse surpasses a melting point;
an ear arrestor, coupled between said ear fuse and ground, generating heat by an over voltage induced in said ear port;
a mouth line of said TIE line type for transmitting a seizure acknowledge signal in response to said seizure signal;
a mouth fuse disposed at a mouth port of said mouth line for melting and forming an electrically open link between said mouth port and said mouth line when a temperature of said mouth fuse surpasses a melting point;
a mouth arrestor, coupled between said mouth fuse and ground, generating heat by an over voltage induced in said mouth port; and
a polyswitch connected to said mouth fuse, via a resistor, for enabling discharge of the over voltage induced in said mouth port when said mouth fuse is melted and said electrically open link is formed between said mouth port and said mouth line.

7. The circuit as claimed in claim 6, wherein said ear arrestor comprises a Zener diode.

8. The circuit as claimed in claim 6, wherein said ear arrestor comprises a vacuum tube containing an ionizing gas.

9. The circuit as claimed in claim 6, further comprised of said ear arrestor suppressing a transient voltage applied to said ear port by forming a path of electrically conduction between said ear fuse and ground after said transient voltage exceeds a discharge voltage characteristic of said ear arrestor.

10. The circuit as claimed in claim 6, wherein each of said ear fuse and said mouth fuse cuts off said over voltage induced into the TIE line type of the private branch exchange.

11. A circuit comprising:
an ear seizure signal detecting apparatus detecting the input of a seizure signal to the ear line;
a switching apparatus switching to off-hook when the seizure signal is detected and maintaining on-hook when the seizure signal is not detected; and
a discharging apparatus comprising:
a mouth fuse connected to a mouth line capable of receiving signals, a mouth arrestor capable of discharging heat,
a resistor connected to said mouth arrestor,
a polyswitch connected to said resistor and capable of switching to and from a normal state upon being heated, and
an attenuation arrestor,
the mouth fuse being opened when a mouth over voltage causes overheating from the heat of said mouth arrestor when the mouth over voltage is induced through a mouth port in an on-hook state, and the mouth over voltage being converted into an attenuation voltage by the mouth arrestor and discharged through the attenuation arrestor when the mouth over voltage is induced through the mouth port in an off-hook state.

12. The circuit as claimed in claim 11, wherein said mouth arrestor comprises a Zener diode.

13. The circuit as claimed in claim 11, wherein said mouth arrestor comprises a discharge tube.

14. The circuit as claimed in claim 11, wherein the attenuation arrestor is capable of suppressing a bi-directional transient voltage.

15. The circuit as claimed in claim 11, wherein the polyswitch returns to a normal state after being opened upon the mouth arrestor generating heat when an overcurrent from the mouth over voltage occurs.

16. A circuit comprising:
ear line over voltage cut-off means comprising
an ear fuse connected to an ear line capable of reception of signals, said ear fuse melting and blowing when temperature of said ear fuse surpasses a melting point, and
an ear arrestor generating heat by an ear over voltage induced through an ear port; and mouth line over voltage cut-off means comprising
ear seizure signal detecting means detecting the input of a seizure signal to the ear line,
switching means switching to off-hook when the seizure signal is detected and maintaining on-hook when the seizure signal is not detected, and discharging means comprising
   a mouth fuse connected to a mouth line capable of receiving signals,
   a mouth arrestor capable of discharging heat,
   a resistor connected to said mouth arrestor,
   a polyswitch connected to said resistor and capable of switching to and from a normal state upon being heated, and
   an attenuation arrestor,
the mouth fuse being opened when a mouth over voltage causes overheating from the heat of said mouth arrestor when the mouth over voltage is induced through a mouth port in an on-hook state, and the mouth over voltage being converted into an attenuation voltage by the mouth arrestor and discharged through the attenuation arrestor when the mouth over voltage is induced through the mouth port in an off-hook state.

17. The circuit as claimed in claim 16, wherein the attenuation arrestor comprises a diode.

18. The circuit as claimed in claim 16, wherein the attenuation arrestor is capable of suppressing a bi-directional transient voltage.

19. The circuit as claimed in claim 16, wherein the polyswitch returns to a normal state after being opened upon the mouth arrestor generating heat when an overcurrent from the mouth over voltage occurs.

20. The circuit as claimed in claim 16, wherein the circuit cuts off overvoltages induced into a transmission line between power systems of a private branch exchange.

21. An over voltage cut-off circuit for a private branch exchange having an E&M TIE line, comprising:
   switching means for switching from on-hook to off-hook when a seizure signal is applied to an E line;
   cutoff means for cutting off an M line when an over voltage exceeding a first threshold value is applied to said cutoff means in an on-hook state;
   discharge means for discharging the M line when an overvoltage exceeding a second threshold value is applied to said discharge means in an off-hook state, the second threshold value being less than the first threshold value.

22. The circuit according to claim 21, wherein the cutoff means cuts off the M line when an over voltage exceeding the first threshold value is applied to the cutoff means in the off-hook state.

23. The circuit according to claim 21, wherein the cutoff means comprises:
   an M fuse; and
   a M arrestor, the M fuse opening due to heat discharged by the M arrestor when an over voltage exceeding the first threshold value is applied to to the M fuse in the on-hook state.

24. The circuit according to claim 22, wherein the M fuse is serially connected between an M line port of the private branch exchange and the switching means and the M arrester is connected between the M fuse and a ground potential.

25. The circuit according to claim 23, wherein the M arrestor comprises a Zener diode.

26. The circuit according to claim 23, wherein the M arrestor comprises a discharge tube.

27. The circuit according to claim 21, further comprising a resistor and a polyswitch connected in series between the cutoff means and the switching means.

28. The circuit according to claim 27, wherein the polyswitch opens due to heat generated by the M arrestor when an over voltage exceeding the first threshold value is applied to the polyswitch and returns to an open state when the over voltage is removed.

29. The circuit according to claim 27, further comprising a resistor serially connected to the polyswitch.

30. The circuit according to claim 23, wherein the discharge means comprises an attenuation arrestor connected between the M line and a ground potential.

31. The circuit according to claim 30, wherein the attenuation arrestor comprises bi-directional transient voltage suppressor diode having a threshold voltage approximately equal to the second threshold value.

32. The circuit according to claim 21, further comprising an E line means for cutting off the E line when an over voltage exceeding a third threshold value is applied to the E line means.

33. The circuit according to claim 32, wherein the E line means comprises:
   an E fuse; and
   an E arrestor, the E fuse opening due to heat discharged by the E arrestor if an over voltage exceeding the first threshold value is applied to the E fuse.

34. The circuit according to claim 33, wherein the E fuse is connected to an E line port of the private branch exchange and the E arrestor is connected between the E fuse and a ground potential.

* * * * *